(12) United States Patent
Cook

(10) Patent No.: US 7,013,158 B1
(45) Date of Patent: Mar. 14, 2006

(54) METHOD AND SYSTEM FOR BROKERING FREQUENCIES TO FACILITATE PEER-TO-PEER COMMUNICATION

(75) Inventor: Fred S. Cook, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 579 days.

(21) Appl. No.: 10/305,341

(22) Filed: Nov. 25, 2002

(51) Int. Cl.
*H04B 7/00* (2006.01)

(52) U.S. Cl. .................... 455/519; 455/416; 455/426.1
(58) Field of Classification Search ................ 455/439, 455/426.1, 552.1, 513, 518, 517, 414.1, 63, 455/67.1, 406, 426, 552, 414
See application file for complete search history.

(56) References Cited

U.S. PATENT DOCUMENTS

| | | | | |
|---|---|---|---|---|
| 5,822,682 A | * | 10/1998 | Schroderus et al. | 455/63.3 |
| 6,292,671 B1 | * | 9/2001 | Mansour | 455/518 |
| 6,415,146 B1 | * | 7/2002 | Capece | 455/517 |
| 6,549,778 B1 | * | 4/2003 | Mulford | 455/426.1 |
| 6,801,519 B1 | * | 10/2004 | Mangal | 370/349 |
| 2003/0013471 A1 | * | 1/2003 | Vilmur et al. | 455/513 |

* cited by examiner

*Primary Examiner*—Tilahun Gesesse
*Assistant Examiner*—Tan Trinh

(57) ABSTRACT

A method and system for brokering frequencies for use in peer-to-peer communication sessions. A frequency broker receives session-participation messages from multiple parties wishing to communicate wirelessly with each other. The broker selects a frequency for the parties to use and then instructs the parties to communicate with each other on the selected frequency. And the parties then engage in peer-to-peer communication with each other over the selected frequency.

28 Claims, 5 Drawing Sheets

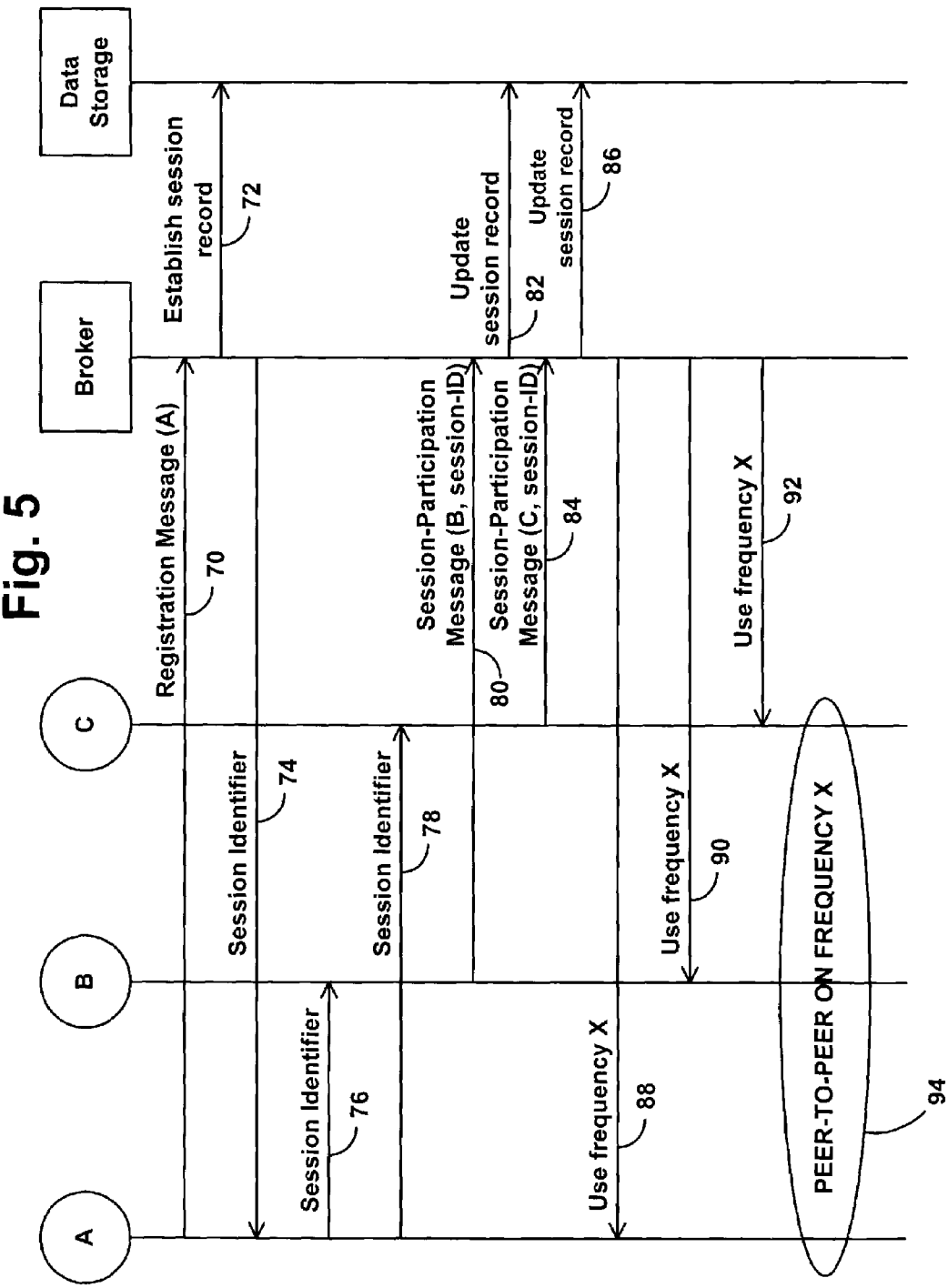

METHOD AND SYSTEM FOR BROKERING FREQUENCIES TO FACILITATE PEER-TO-PEER COMMUNICATION

BACKGROUND

1. Field of the Invention

The present invention relates to wireless communications, and more particularly to establishment of peer-to-peer wireless communications.

2. Description of Related Art

In a typical peer-to-peer wireless communication session, all of the participating users tune their communication devices to a common frequency for the session. Each user can then send and receive signals over that common frequency so as to communicate with the other user(s).

In many cases, peer-to-peer wireless communications operate within a public-use frequency spectrum, which is a set of frequencies freely available for use by members of the public. (While governmental regulations might restrict the manner of use of public use frequencies, regulations usually do not restrict who can use the frequencies.) Contrasted with public-use frequencies, are licensed frequencies, such as those typically employed by wireless telecommunication carriers (e.g., in the 800 to 900 MHz and 1800 to 1900 MHz ranges), which are not freely available for use by members of the public. As a result, public use frequencies may also be referred to as "unlicensed" frequencies.

An example of a frequency range in the public use spectrum is the 462.5625 to 467.7125 MHz band allocated for "Family Radio Service" (FRS). Advanced FRS units, such as Talkabout® handheld radios manufactured by Motorola, Inc., for instance, allow users to select from 14 channels, each defined respectively within the FRS band. Users may also set their devices to use a particular squelch code, or CTCSS code, which effectively allows communication in the selected channel with other devices that are set to use the same CTCSS code. Thus, for instance, a group of users might agree in advance to tune their FRS devices to channel 9 and CTCSS code 20, and the users may then communicate with each other.

Commonly, the users will agree in advance what frequency to use. (In this regard, as used herein, the term "frequency" could mean a single frequency, a frequency range, and/or, more generally, any communication channel.) For instance, the users might call each other by telephone or meet in person to select a frequency to use, and each user will then tune his or her respective device to the selected frequency.

Unfortunately, however, it is often difficult to reliably select a frequency that will support communications in the public use spectrum. Many times, public use frequencies are busy or noisy. Thus, if a group of users decides to communicate on a given frequency and the users then disperse throughout a given area, it is possible that some or all of the users might encounter interference on the agreed frequency. Further, in many cases, a group of users might not be able to get together in advance to agree on a frequency to use.

SUMMARY

In order to overcome this problem, an exemplary embodiment of the present invention provides a mechanism for brokering frequencies to facilitate peer-to-peer wireless communications. As a general matter, a frequency broker (an independent entity or a function incorporated in some other entity) will function as an informational tie point for parties wishing to engage in peer-to-peer wireless communication and will instruct the participating parties to communicate with each other on a given frequency.

For example, the frequency broker could receive session-participation messages from multiple parties seeking to engage in a peer-to-peer wireless session with each other. And the broker could then instruct all of those parties to communicate with each other on a specific frequency. The parties could then tune their devices to that frequency and proceed to engage in a peer-to-peer communication session with each other. Further, during the ongoing session, the broker may instruct the parties to switch to a different frequency, and the parties may then switch to that different frequency and continue communicating with each other.

Preferably, at least one of the session-participation messages (and perhaps all of them) will include a session-identifier keyed to the session, and the broker will recognize that session-identifier and will thereby associate the session-participation message with the session. In this regard, for instance, one of the parties could first send a registration message to the broker as a request to set up the session (and perhaps also as a session-participation message), and the broker could responsively establish a data record that associates a session-identifier with the requested session. The registering party may then give that session-identifier to each of the other parties, and each other party could include the session-identifier in his or her respective session-participation message to the broker.

Further, each session-participation message will preferably include a source-identifier that indicates the party wishing to participate and preferably allows the broker to communicate with that party. Each time the broker receives a session-participation message, the broker may then include an indication of that source-identifier in the session data record, so as to indicate that the party is one of the session participants.

According to another aspect, the broker could select the frequency that the broker instructs the parties to use for their communication session. In this regard, for instance, the broker could randomly select the frequency. Or the broker could logically select the frequency based on factors such as reports as to which frequencies are available at the parties' respective locations. To facilitate that logical selection, the parties could monitor frequencies and, autonomously or when prompted by the broker, report frequency-availability information to the broker. Or the parties could report their locations to the broker, and the broker could select a frequency that is available or that is likely to be available in all of the parties' locations. Further, the broker could select the frequency by having one of the parties pick a frequency from among multiple frequencies that the broker determined to be available for use by the parties.

To receive session-participation messages and to instruct the parties which frequency to use, the broker will preferably communicate with the parties over one or more control channels, preferably wirelessly (at least in part). To avoid contention issues, the control channels will preferably not overlap with the frequencies or channels that the parties could use to communicate with each other. Thus, for instance, the parties could communicate with the broker over a licensed frequency band (such as a PCS band), while the parties would communicate with each other on an unlicensed frequency (such as an FRS frequency).

Further, in the event one of the parties is unable to communicate with the other parties on the frequency designated by the broker, the broker could instruct that party to communicate with an intermediary (e.g., the broker) and the intermediary could then communicate with the other parties on the designated frequency. That way, the intermediary could function as an interface for the unable party.

Further aspects and advantages will become apparent to those of ordinary skill in the art by reading the detailed description below, with reference where appropriate to the accompanying drawings.

BRIEF DESCRIPTION OF THE DRAWINGS

An exemplary embodiment of the present invention is described herein with reference to the drawings, in which:

FIG. 5 is a message flow depicting process steps in accordance with the exemplary embodiment.

DETAILED DESCRIPTION OF AN EXEMPLARY EMBODIMENT

1. General Arrangement and Operation

Figure 1:
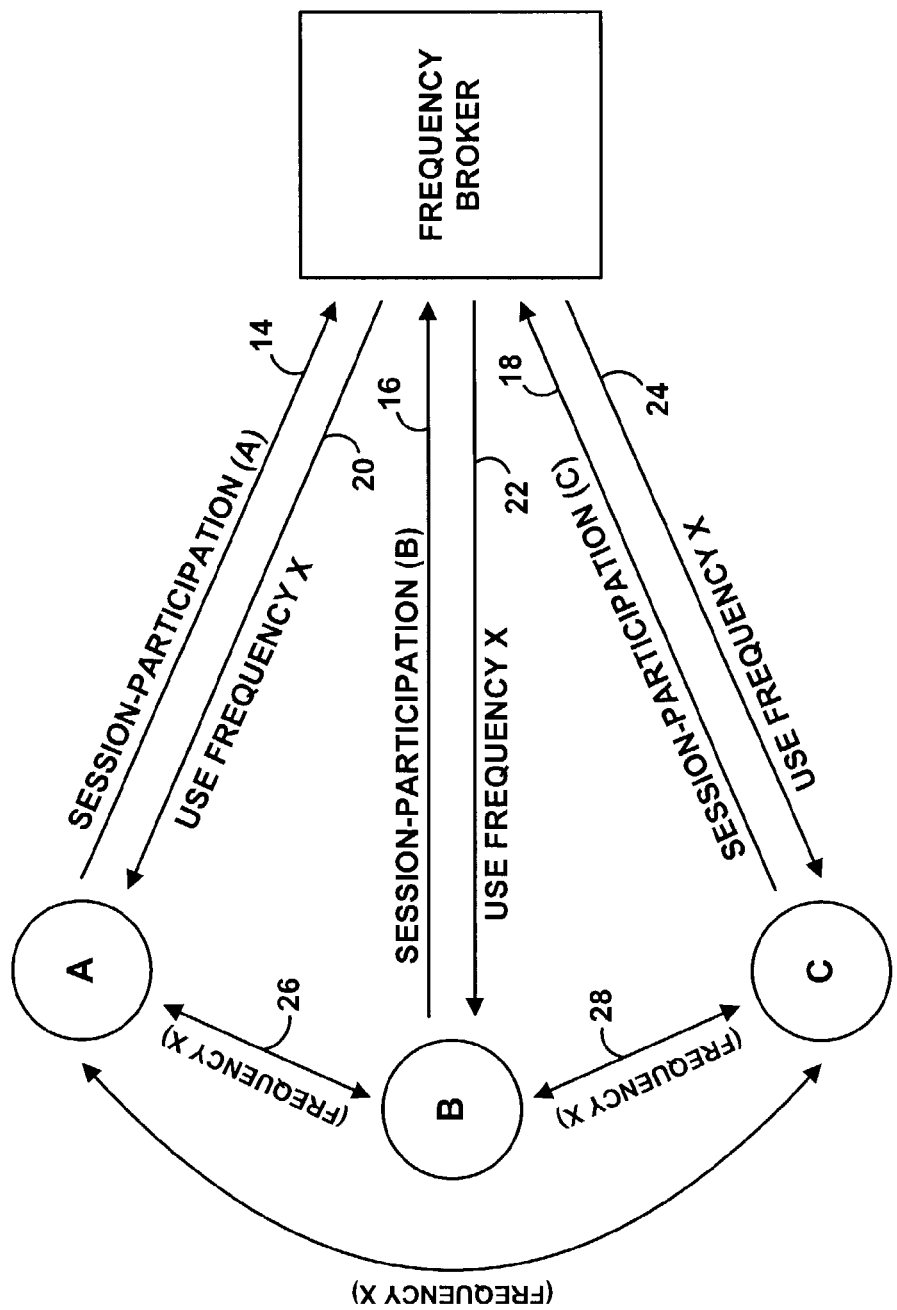
FIG. 1 is a simplified block diagram of a communication system in accordance with the exemplary embodiment.

Referring to the drawings, FIG. 1 is a simplified block diagram of a communication system arranged in accordance with an exemplary embodiment of the present invention. As shown in FIG. 1, three parties, A, B and C, desire to engage in a peer-to-peer communication session with each other. And a frequency broker 12 is in place to facilitate their session, by learning that the parties want to participate and by instructing all of the parties to communicate with each other on a common frequency. FIG. 1 designates by arrows some of the control communications that might occur between these parties and the broker in order to facilitate the peer-to-peer session.

According to the exemplary embodiment, as shown generally at arrows 14, 16 and 18, parties A, B and C will each send a respective session-participation message to broker 12. And all of these session-participation messages will preferably include a parameter, such as a session-identifier, that the broker can use to associate all of the messages with the session. Further, each session-participation message will preferably include a source-identifier that identifies the party sending the message, sufficient to allow the broker to be able to communicate with the party.

Thereafter, as shown at arrows 20, 22 and 24, the broker will instruct all of the parties (to the session) to communicate with each other on a common frequency, designated by example in FIG. 1 as frequency "X". And in response to these instructions from the broker, the parties may then engage in peer-to-peer communication with each other on that designated frequency, as shown at arrows 26, 28, 30.

Figure 2:
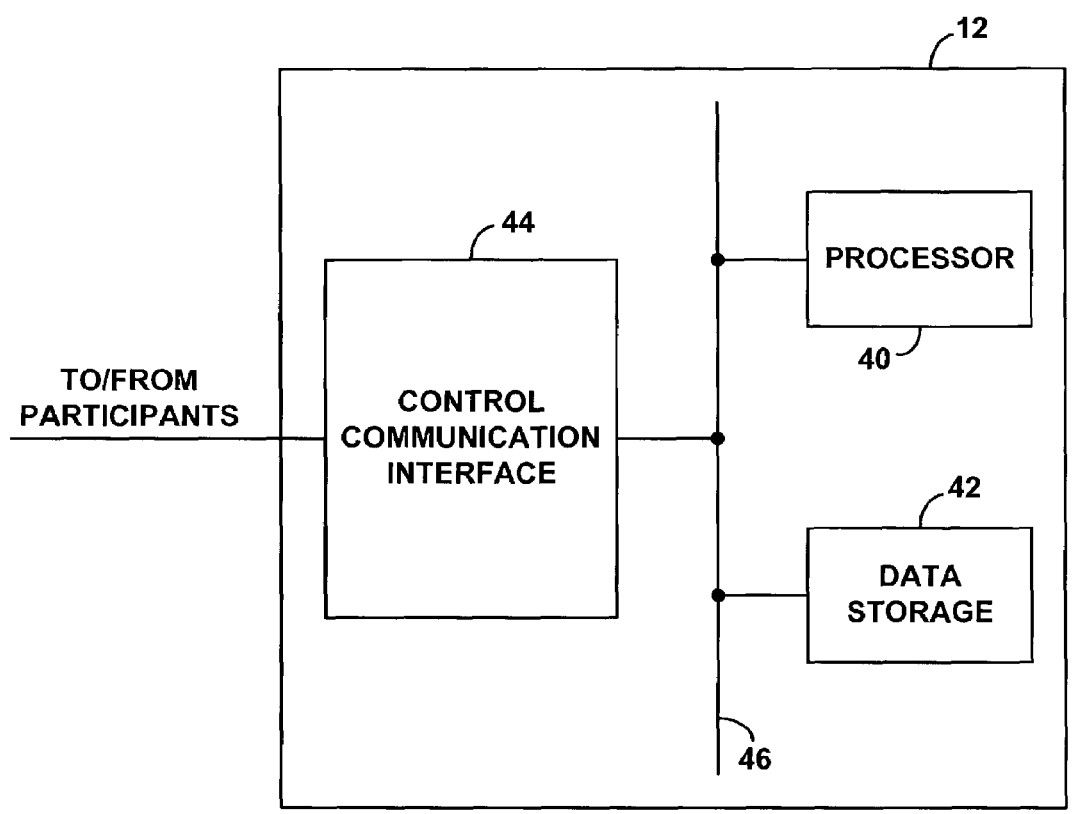
FIG. 2 is a simplified block diagram of an exemplary frequency broker.

Turning now to FIG. 2, a simplified block diagram of an exemplary frequency broker 12 is shown. As depicted in FIG. 2, exemplary broker 12 includes a processor (i.e., one or more processors) 40, data storage 42, and a control communication interface 44, which may be coupled together by a mechanism 46 such as a system bus or a network.

In the exemplary embodiment, data storage 42 contains program instructions (e.g., machine language instructions) that are executable by processor 40 to carry out various functions described herein. Those functions include, for instance, receiving session-participation messages from parties, selecting a frequency for the parties to use in peer-to-peer communication, and generating instructions advising the parties to use the selected frequency. Further, data storage 42 will preferably hold a session record (e.g., a data file/table) that lists the participants in a given session and that indicates the frequency selected for use in that session. And the program instructions may be executable by processor 40 to establish and maintain the session record.

Control communication interface 44, in turn, functions to allow broker 12 to engage in control communications with the various session participants (and with an originator of the session, if the originator is not a participant), as an interface between processor 40 and the participants. As such, control communication interface 44 could be one or more different types of interfaces, depending on the manner in which control communication will occur. For example, if the broker communicates over a direct wireless link with a session participant, the control communication interface 44 could include a wireless communication interface, including a suitable antenna and transceiver. And as another example, if the broker communicates with one or more of the parties via a telephone link or other network link, the control communication interface could include a suitable telephone interface (e.g., a telephone and/or modem) or network interface (e.g., an Ethernet NIC or Irda interface). Other examples are possible as well.

Figure 3:
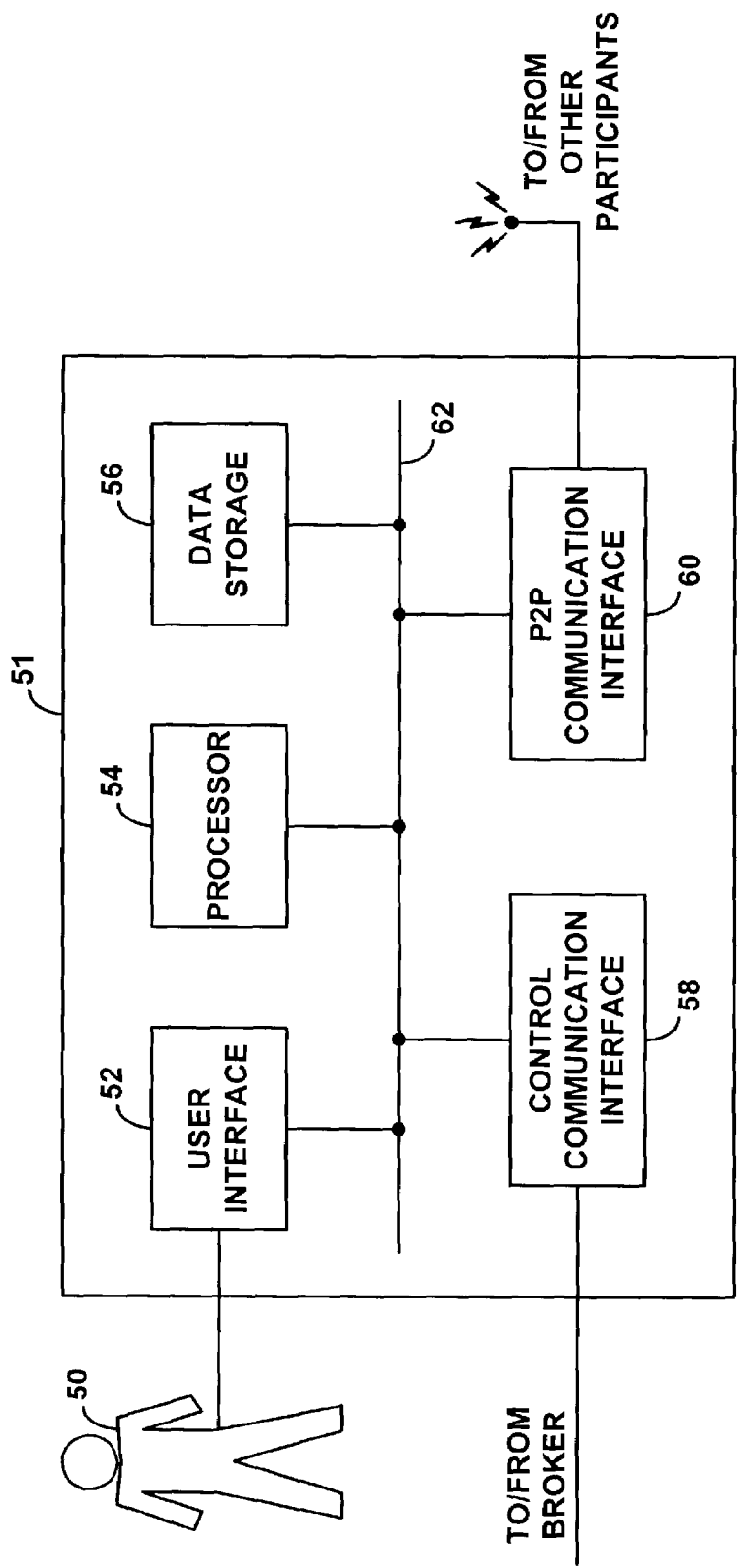
FIGS. 3 and 4 are simplified block diagrams of exemplary session participants.
Figure 4:
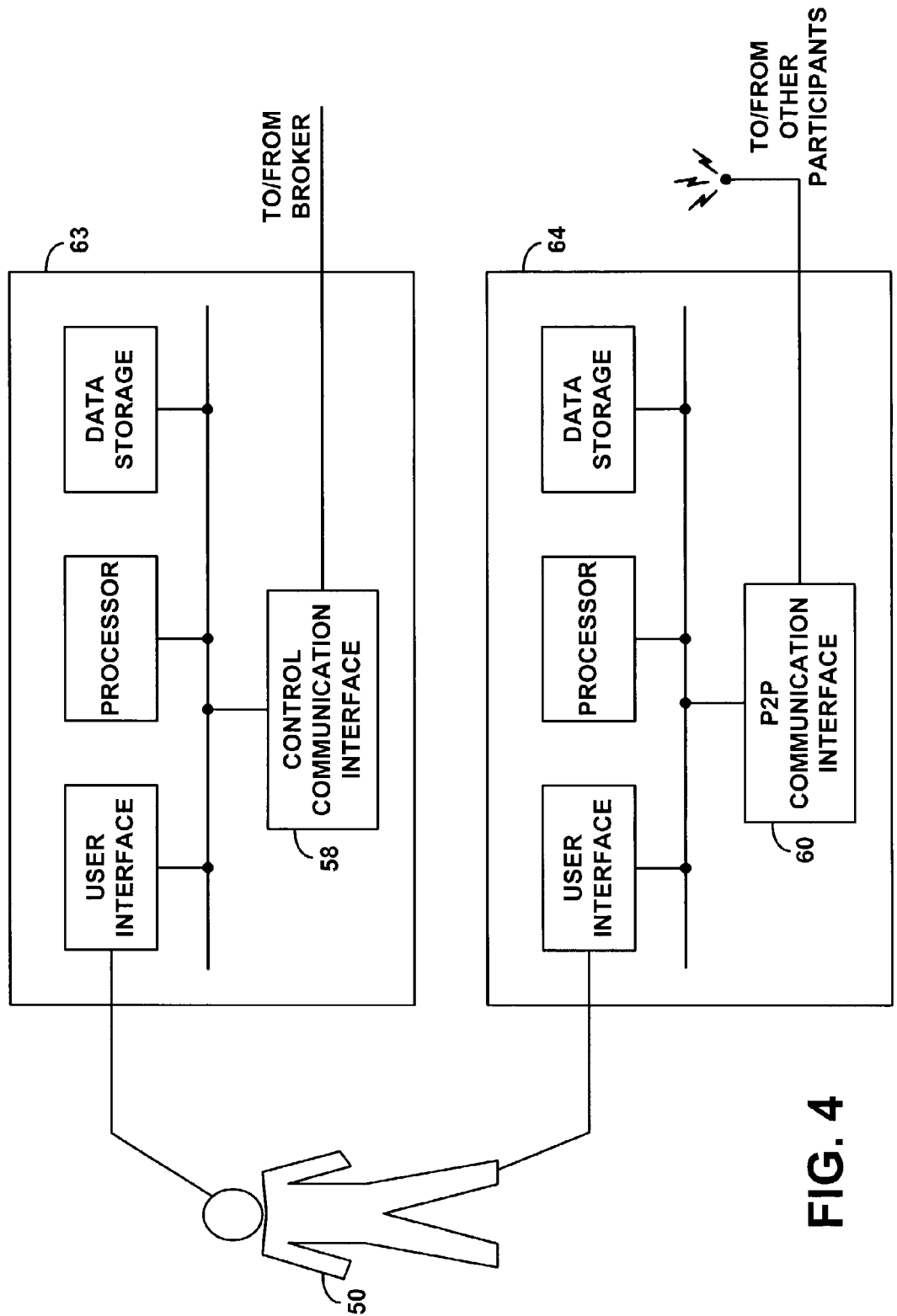

Tuning next to FIGS. 3 and 4, simplified block diagrams of an exemplary session participant are shown. The exemplary participant could represent party A, party B and/or party C. In both FIG. 3 and FIG. 4, the exemplary session participant is shown to include a person 50, who will be engaging in peer-to-peer communication with other participants. Both figures then depict one or more devices that the person may use to engage in the peer-to-peer communication and to facilitate control communication with broker 12.

As shown in FIG. 3, person 50 could operate a single device 51 equipped to function as both a peer-to-peer radio unit and a control interface with broker 12. As such, the device might include a user interface 52, a processor 54, data storage 56, a peer-to-peer (P2P) communication interface 58 and a control communication interface 60, tied together by a system bus or other link 62.

User interface 52 may include a speaker and microphone circuit, or a headset, to allow the user to engage in voice communication via the device. Additionally, user interface 52 might include a display and a data entry mechanism (such as a touch sensitive screen, dial, buttons, keyboard or microphone) through which the user could engage in data communication and other interactions with the device.

Data storage 56, in turn, may include instructions executable by processor 54 to carry out various functions, such as generating and sending via control interface 58 a session-participation request, receiving via control interface 58 a frequency-use instruction, presenting a selected frequency to person 50 via user interface 52, and/or tuning P2P communication interface 60 to the selected frequency. Further, data storage 56 can preferably hold other data such as designations of source-identifier, session-identifier, and selected frequency.

Control communication interface 58 then functions as a mechanism for communication with broker 12. Just as the broker's control communication interface 44 can take various forms, so too can control communication interface 58 take various forms. Merely by way of example, control communication interface 58 could be a 3G CDMA (or other protocol) circuit and associated control software, to enable the device to establish a packet-data session with broker 12 via a cellular communication system such as the Sprint PCS network for instance.

And P2P communication interface 60 then functions as a mechanism for peer-to-peer communication with other parties. For instance, P2P communication interface 60 could be an FRS transceiver (with associated control software) that can be manually or automatically tuned to a designated frequency. Further, user interface 52 would preferably include a conventional mechanism through which person 50 could set the frequency of P2P communication interface.

As shown next in FIG. 4, these communication and control functions could instead be split among two or more separate devices 63, 64 that person 50 uses. Person 50 might use device 63 to communicate engage in control communication with broker 12, and person 50 might use device 64 to engage in peer-to-peer communication with other users. Thus, through use of device 63 with control communication interface 58, person 50 might submit a session-participation message to broker 12 and might receive from broker 12 a frequency instruction designating a peer-to-peer frequency to use. And person 50 might then tune device 64 with P2P communication interface 60 to communicate on that designated frequency. Alternatively, device 63 could itself communicate (wirelessly or through a wired link) with device 64 in order to automatically tune device 64 to the designated frequency.

Turning now to FIG. 5, a more detailed message flow diagram is provided, to help further illustrate operation of the exemplary embodiment. The process shown in FIG. 2 assumes that party A is an "originating party", in that party A causes frequency broker 12 to assign a frequency for the session. Further, it should be understood that the order of steps shown in FIG. 3 and otherwise described herein could vary from that shown and described.

As shown in FIG. 5, at step 70, party A first sends a registration-message to the broker 12. The registration message might inform the broker that party A wants to establish a peer-to-peer session, and the registration message preferably carries a source-identifier indicative of party A. In the exemplary embodiment, the source-identifier could be a simple user ID and/or it could be a network address, phone number, code, frequency or other value that indicates how the broker can communicate with the party. For example, if the broker will communicate with party A via a direct wireless link, the source-identifier might indicate a control-channel frequency over which they will communicate. And as another example, if the broker will communicate with party A via an IP network link (e.g., via a 3G connection to party A), the source-identifier might be an IP address assigned to party A. (Further, the source-identifier could map to a device identifier, to allow the broker to know device capabilities, so as to facilitate communication.) Other examples are possible as well.

Further, the registration message could carry a session-identifier that party A wants to use for the session; alternatively or additionally, the broker could assign a session-identifier to be used for the session. The session-identifier can take various forms as well. For example, the session-identifier could be party A's source-identifier, since party A is the session originator. Or the session-identifier could be some randomly assigned code or value that the broker can map to the session.

The registration message may itself also constitute a session-participation message by party A. In particular, by sending the registration message, party A could be not only invoking the frequency-brokering service for a session, but party A could also be indicating a desire to participate in the session.

In response to the registration message, at step 72, the broker 12 then establishes a record of the session in data storage. In this regard, for instance, the broker might already have a record for party A in data storage, and the broker might update that record to reflect the session, and/or the broker might already have a record for the session, and the broker might update that record to reflect participation by party A. Alternatively, the broker might create a new session record that reflects the session and, if appropriate, the fact that party A will be involved in the session. Preferably, the session record will indicate the session-identifier for the session, and the record will reflect party A's source-identifier.

If party A does not already know the session-identifier, the broker may then inform party A of the session-identifier for the session, as shown at step 74. In turn, at steps 76 and 78, party A preferably conveys the session-identifier to each of the other parties, namely, parties B and C, to allow them to gain access to the frequency-brokering service. Alternatively, if party A knew the session-identifier in advance, party A could give the session-identifier to the other parties before sending the registration message to the broker.

As next shown at steps 80 and 84 in FIG. 5, each of the other parties will then send a respective session-participation message to the broker, to register their participation in the session. And each party's session-participation message will preferably include the session-identifier (or a respective parameter that the broker can map to the session), as well as a source-identifier reflecting the identity of the party. Each party's source-identifier can take various forms, as described above with respect to party A's source identifier.

As the broker receives a session-participation message from a party, the broker will preferably read the session-identifier and source-identifier from the message, and the broker will responsively tailor (e.g., update) the session-record to indicate participation in the session by party. Thus, for instance, after the broker receives a session-participation message from party B at step 80, the broker may write party B's source-identifier into the session-record, to indicate that party B is a participant in the session, as shown at step 82. Similarly, after the broker receives a session-participation message from party C at step 84, the broker may write party C's source-identifier into the session-record, to indicate that party C is a participant in the session, as shown at step 86.

In the exemplary embodiment, upon establishment of the session-record, or once the broker has received session-participation messages from one or more of the parties (if not earlier), the broker will select a frequency that the parties should use to engage in peer-to-peer communication with each other. And the broker may record the selected frequency into the session-record for later reference.

In turn, the broker may inform the session participants of the selected frequency, so that the session participants can engage in peer-to-peer communication with each other over the selected frequency. In this regard, for instance, the broker may send a frequency-use instruction respectively to each of the participants (or all at once, if the participants engage in control communication with the broker over a shared channel), as shown at steps 88, 90, 92 in FIG. 5. As above, the selected frequency is designated as frequency "X" for illustration.

Parties A, B and C may then each respond to the frequency-use instruction from broker 12 by tuning their respective peer-to-peer communication devices to operate on the selected frequency. Alternatively, as noted above, the parties might operate a unified control/P2P device or a control device that can itself communicate with a P2P device to automatically tune the P2P device to the selected frequency. In any event, the parties may then begin to engage in peer-to-peer communication with each other on the selected frequency.

2. Selection of Frequencies

In accordance with the exemplary embodiment, broker 12 can select the frequency in various ways. As an example, the broker could randomly select the frequency, that is, without applying intelligence to determine which frequency would work well for the parties. For instance, the broker could randomly select frequencies for communication sessions on a first come first served basis, by assigning frequencies in order from a list of possible frequencies stored in data storage 42.

As another example, the broker could select the frequency by applying logic to determine which frequency would work well for the parties. In this regard, for instance, the broker could determine which frequencies are currently available (i.e., not being used and/or not suffering from interference) in the area where the parties are currently located, and the broker could select one of those frequencies.

To determine which frequencies are available in the area where the parties are located, the broker (or some other entity with which the broker communicates) could poll the parties, and the parties could responsively report frequency-availability information. In this regard, each party's communication device (e.g., device 51 shown in FIG. 3) could be programmed to receive from the broker a signaling message (command) that instructs the device to monitor a given frequency range or all available frequencies. In response to that message, the device could automatically scan the given frequency range and report back to the broker which frequencies are clear of interference (noise or other use) and which frequencies are not clear.

For a given session, the broker could then programmatically poll all of the participants to find out what frequencies are available for use by each participant. And the broker could then determine which frequency or frequencies are available for use by all of the parties to the session.

For instance, of possible frequencies f1, f2 and f3, assume that party A detects and reports interference on only frequency f1, party B detects and reports interference on only frequency f3, and party C detects and reports that all three frequencies are clear of interference. The broker could thereby decide that frequency f2 is available for use by all three of the parties, and so the broker could select frequency f2.

Alternatively, the broker could determine the current locations of each of the parties to the session, and the broker could use that location information as a basis to select a frequency for the parties to use. In this regard, for instance, each session-participation message could carry an indication of the sending party's current location (determined by a GPS receiver (not shown) on the party's device 51, for instance). And the broker could then query a data store or other entity to determine what frequencies are available for use by the parties in that area, and the broker could select one of those frequencies.

Still further, in any instance where the broker identifies multiple frequencies that are available for use by the parties, the broker could prompt a user (e.g., one of the parties, such as originating party A for instance) to select a frequency to use from among those deemed to be available. The user could then select a frequency, and the broker could instruct all of the parties to communicate on that selected frequency.

3. Control Channels

In the exemplary embodiment, the broker will communicate with the parties on one or more control channels (frequencies), which are preferably in a licensed frequency range so that no contention occurs for the control connection. For example, the parties could communicate with the broker via a licensed cellular frequency range, such as by establishing 3G CDMA (or other protocol) packet-data link with a network on which the broker sits (or by establishing some other reliable channel, such as a landline telephone link or infrared link, with the broker). In that case, the broker would have an IP address and a party's device would have an IP address (e.g., a Mobile IP address), so the broker and the party's device could pass control communications between their respective IP addresses. Thus, through the 3G link, each party could (i) provide the broker with a session-participation message and (ii) receive frequency-use instructions and polling requests from the broker, and (iii) report frequency-availability to the broker. And as another example, a session participant could communicate with the broker via a landline telephone connection.

The broker may thus communicate with the parties over a frequency range or medium different than that in which the parties will communicate with each other. Alternatively, the parties could communicate with the broker within a frequency range that includes the channels over which the parties will communicate with each other. For instance, the parties could communicate with the broker over an FRS channel designated as a control channel, or otherwise within the FRS frequency range (using a positive identification method to identify the broker), and the broker could then assign an FRS frequency on which the parties can engage in peer-to-peer communication with each other.

4. Intermediary Function

In the exemplary embodiment, the broker may also facilitate session participation by a party who is unable to use the selected frequency, such as a party who does not have a radio unit compatible with the assigned frequency, or a party who is in a location where the selected frequency is not available. In that scenario, the broker could instruct the party to communicate with an intermediary entity on a secondary, bridging frequency (i.e., some frequency other than that selected for use in the peer-to-peer communication). And the intermediary could then interface (directly or through one or more other entities) between (i) the party operating on the bridging frequency and (ii) the other parties operating on the frequency assigned for the peer-to-peer session.

In this regard, upon determination that a party is unable to communicate on the selected session frequency, the party and broker could agree to have the party use the bridging frequency. (For instance, the party may request use of the bridging frequency, or the broker may instruct the party to use the bridging frequency). The party may then access the bridging frequency, and the intermediary would be set to receive traffic on that bridging frequency and retransmit it on the session frequency, and to receive traffic on the session frequency and retransmit it on the bridging frequency.

In the exemplary embodiment, the intermediary and broker could be integrated together as a single platform. That way, the broker could readily cause the intermediary to interface between session frequency and bridging frequency. Alternatively, the broker could otherwise control the intermediary.

5. Assignment of Multiple Frequencies

In accordance with another aspect of the exemplary embodiment, the exemplary frequency broker could also be employed to select and assign multiple frequencies for use in a given session. This might be useful, for instance, when a group of users wants to be able to engage in two concurrent peer-to-peer sessions with each other. (One might be a voice session and the other might be a data session, for example. Or one might be a voice session concerning one topic, and the other might be a voice session concerning another topic.) To provide this function, the broker could correlate a single session-identifier with multiple frequencies, recording the session-identifier and the multiple frequencies in a single session record, or subsets of a single session record. When a party then sends to the broker a session-participation message carrying the session-identifier, the party could indicate in the message a session-type (such as voice, or data; or such as one topic, or another topic) and the broker could responsively instruct that party to use a frequency selected for use in that peer-to-peer session. Or absent a designation of session-type, the broker could simply instruct the party to use any one of the multiple frequencies selected for the session.

6. Cost Recovery

In order to support the exemplary frequency brokerage service, users of the service could pay for the service. In this regard, for instance, frequency-brokerage provider could host the broker on a packet-switched network, and an originating party could pay the provider for establishing a session record and for functioning as the tie point for the session. Further, the originating party could pay the provider more for additional services. For instance, the originating party could pay the provider for intelligently selecting a frequency for the parties to use, and the originating party could pay a variable fee depending on how many parties the broker coordinates.

7. Implementation Suggestions

Conveniently, several programs exist today that could be modified to facilitate some of the functions described above. For example, the process of maintaining a session-record that correlates a particular frequency with a given session is analogous to the process carried out by a Domain Naming System (DNS) server. A DNS server correlates domain names with IP addresses and responds to a DNS query by noting the IP address corresponding to a given domain name. With slight modification, a DNS server could be used to instead correlate session-identifiers with frequencies. Thus, in response to a session-participation message and/or session-identifier provided by a given party, the server could return to the party an indication of a frequency that has been selected for the session.

This DNS arrangement will also work particularly well to support brokering of multiple frequencies for a single session. In this regard, a DNS server can normally receive a URL (with a domain name) and a service type (e.g., FTP, HTTP, etc.) and can return an IP address in response. Modifying the DNS server as presently contemplated, the service type could become a session type (e.g., voice or data, type of data, session topic, etc.), the URL would become the session-identifier, and the IP address would become one or more frequencies that the broker has selected for use in the session of the given type.

And as another implementation example, the process of selecting a frequency that is available for use by all of the parties to a given session is somewhat analogous to (but simpler than) the process carried out by commercially available scheduling programs, such as Microsoft Outlook® for instance. Such a scheduling program normally receives time-availability information from various meeting participants and indicates one or more times at which all of the parties are available. With slight modification, such a scheduling program could be used to collect frequency-availability information instead of time information, and to indicate one or more frequencies available for use by all of the parties to a given session. An exemplary broker could then instruct the parties to communicate with each other on one of the identified frequencies.

8. Conclusion

An exemplary embodiment has been shown and described above. Those skilled in the art will understand, however, that changes and modifications can be made to the exemplary embodiment without deviating from the scope of the invention as defined by the claims.

For instance, although the foregoing description focuses on selection and assignment of common "frequency" for use in a peer-to-peer wireless communication session, it should be understood that selection and assignment of a frequency could equally include selection and assignment of other communication mechanisms as well. For example, a frequency broker as presently contemplated could assign a group of FRS users to communicate with each other on a given frequency and to set their devices to a given CTCSS code. Further, the term "frequency" could more generally mean a communication channel of some sort. Other examples are possible as well.

I claim:

1. A method comprising:
   receiving from an originating party a registration message for a peer-to-peer wireless communication session;
   responsive to the registration message, establishing in data storage a session-record for the peer-to-peer wireless communication session;
   receiving originating party payment for establishing the session-record;
   receiving a session-participation messages from each of a plurality of parties seeking to participate in the peer-to-peer wireless communication session with each other, wherein at least one of the session-participation messages carries a session-identifier keyed to the wireless communication session;
   recognizing the session-identifier in at least the one session-participation message; and
   responsive to the session-participation messages, instructing the parties to directly communicate with each other on a common frequency,
   whereby the parties then directly communicate with each other on the common frequency.

2. A method comprising:
   receiving from an originating party a registration message for a peer-to-peer wireless communication session;
   responsive to the registration message establishing in data storage a session-record for the peer-to-peer wireless communication session;
   sending to the originating party a message indicating a session-identifier for the peer-to-peer wireless communication session, whereby the originating party conveys the session-identifier to one or more other parties;
   receiving a session-participation message respectively from each of a plurality of parties seeking to participate in the peer-to-peer wireless communication session with each other, wherein at least one of the session-participation messages carries the session-identifier provided by the originating party;

recognizing the session-identifier in at least the one session-participation message; and responsive to the session-participation messages, instructing the parties to directly communicate with each other on a common frequency, whereby the parties then directly communicate with each other on the common frequency.

3. The method of claim 2, wherein selecting the common frequency comprises selecting multiple frequencies including the common frequency, and wherein the method further comprises:

in the session-record, correlating the multiple frequencies with the session.

4. The method of claim 2, wherein the session-participation messages are wirelessly transmitted from the plurality of parties on one or more frequencies that do not overlap the common frequency.

5. The method of claim 4, wherein the one or more frequencies are within a licensed frequency range, and the common frequency is an unlicensed frequency.

6. The method of claim 2, wherein the common frequency is an unlicensed frequency.

7. The method of claim 6, wherein the common frequency is an FRS band frequency.

8. The method of claim 6, wherein the common frequency is an FRS band frequency.

9. The method of claim 2, further comprising:

instructing a given party to communicate with an intermediary on a frequency other than the common frequency; and the intermediary interfacing between (i) communications with the given party on the frequency other than the common frequency and (ii) communications with the plurality of parties on the common frequency, thereby allowing the given party to communicate with the plurality of parties.

10. The method of claim 2, wherein the session-participation message from at least one of the parties is transmitted to the broker over path comprising a wireless link from party.

11. The method of claim 2, wherein instructing the parties to directly communicate with each other on a common frequency comprises instructing the parties to directly communicate with each other on multiple common frequencies, whereby the parties then directly communicate with each other on the multiple common frequencies.

12. The method of claim 2, wherein all of the session-participation messages include the session-identifier, and wherein recognizing the session-identifier in at least the one session-participation message comprises recognizing the session-identifier in each of the session-participation messages.

13. The method of claim 2, further comprising:

while the parties are directly communicating with each other on the common frequency, instructing the parties to communicate with each other on another common frequency, whereby the parties then switch to directly communicate with each other on the other common frequency.

14. The method of claim 2, wherein one of the session-participation messages is the registration message.

15. The method of claim 2, wherein each of the session-participation messages further carries a source-identifier keyed to the party from whom the session-participation message was received, the method further comprising, for each session-participation message received:

reading the source-identifier from the session-participation-message; and tailoring the session-record to reflect participation in the communication session by the party from whom the session-participation message was received.

16. A method comprising:

receiving session-participation messages from a plurality of parties seeking to participate in a peer-to-peer wireless communication session with each other, at least one of the session-participation messages carrying a session-identifier keyed to the wireless communication session;

recognizing the session-identifier in at least the one session-participation message; and responsive to the session-participation messages, instructing the parties to directly communicate with each other on a common frequency, whereby the parties then directly communicate with each other on the common frequency, wherein the method further comprises selecting the common frequency and receiving payment for selecting the common frequency.

17. The method of claim 16, wherein selecting the common frequency comprises randomly selecting the common frequency.

18. The method of claim 16, wherein selecting the common frequency comprises:

receiving frequency-availability information from the parties; and selecting the common frequency based on the frequency-availability information received from the parties.

19. The method of claim 18, wherein selecting the common frequency further comprises:

requesting the frequency-availability information from the parties, and receiving the frequency-availability information in response.

20. The method of claim 19, wherein requesting the frequency-availability information from the parties comprises requesting each of the parties to determine one or more conditions of a respective frequency range; and and wherein receiving the frequency-availability information comprises receiving from each of the parties information about the respective frequency range.

21. The method of claim 16, wherein the session-participation messages are wirelessly transmitted from the plurality of parties on one or more frequencies that do not overlap the common frequency.

22. The method of claim 21, wherein the one or more frequencies are within a licensed frequency range, and the common frequency is an unlicensed frequency.

23. The method of claim 16, wherein the common frequency is an unlicensed frequency.

24. The method of claim 16, further comprising:

instructing a given party to communicate with an intermediary on a frequency other than the common frequency; and the intermediary interfacing between (i) communications with the given party on the frequency other than the common frequency and (ii) communications with the plurality of parties on the common frequency, thereby allowing the given party to communicate with the plurality of parties.

25. The method of claim 16, wherein the session-participation message from at least one of the parties is transmitted to the broker over path comprising a wireless link from party.

26. The method of claim 16, wherein instructing the parties to directly communicate with each other on a common frequency comprises instructing the parties to directly communicate with each other on multiple common frequencies, whereby the parties then directly communicate with each other on the multiple common frequencies.

27. A method comprising:

receiving session-participation messages from a plurality of parties seeking to participate in a peer-to-peer wireless communication session with each other, at least one of the session-participation messages carrying a session-identifier keyed to the wireless communication session;

recognizing the session-identifier in at least the one session-participation message; and responsive to the session-participation messages, instructing the parties to directly communicate with each other on a common frequency, whereby the parties then directly communicate with each other on the common frequency, wherein the method further comprises selecting the common frequency, wherein selecting the common frequency comprises (i) determining locations of the parties, and (ii) selecting as the common frequency a frequency available for use in the locations of the parties.

28. The method of claim 27, wherein determining locations of the parties comprises:

receiving location information from the parties, the location information indicating locations of the parties.

* * * * *